US008512619B2

(12) United States Patent
Tutmark

(10) Patent No.: US 8,512,619 B2
(45) Date of Patent: Aug. 20, 2013

(54) METHODS FOR MANUFACTURING A GOLF BALL

(75) Inventor: Bradley C. Tutmark, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 83 days.

(21) Appl. No.: 12/961,425

(22) Filed: Dec. 6, 2010

(65) Prior Publication Data
US 2012/0139144 A1     Jun. 7, 2012

(51) Int. Cl.
  *B29C 45/14*     (2006.01)
  *B29C 70/70*     (2006.01)
(52) U.S. Cl.
  USPC ....... 264/278; 264/279.1; 264/40.1; 264/40.5
(58) Field of Classification Search
  None
  See application file for complete search history.

(56) References Cited

U.S. PATENT DOCUMENTS

| | | | |
|---|---|---|---|
| 4,470,786 A * | 9/1984 | Sano et al. | 425/125 |
| 4,959,000 A | 9/1990 | Giza | |
| 5,543,105 A | 8/1996 | Stummer et al. | |
| 5,639,403 A * | 6/1997 | Ida et al. | 264/40.1 |
| 5,683,730 A | 11/1997 | Katsumata et al. | |
| 5,827,548 A | 10/1998 | Lavallee et al. | |
| 6,235,230 B1 * | 5/2001 | Puniello | 264/278 |
| 6,866,802 B2 | 3/2005 | Puniello et al. | |
| 6,890,477 B2 | 5/2005 | Homann et al. | |
| 7,017,412 B2 | 3/2006 | Thomas et al. | |
| 7,396,222 B2 * | 7/2008 | Saito | 425/116 |
| 7,481,642 B2 | 1/2009 | Niewels | |
| 7,559,762 B2 | 7/2009 | Dewar et al. | |
| 8,038,921 B2 * | 10/2011 | Itabashi et al. | 264/278 |
| 2002/0017732 A1 * | 2/2002 | Koyama et al. | 264/39 |
| 2002/0086074 A1 * | 7/2002 | Lavallee | 425/116 |
| 2006/0237874 A1 | 10/2006 | Kurihara et al. | |
| 2007/0292557 A1 * | 12/2007 | Dewar et al. | 425/564 |
| 2008/0199553 A1 | 8/2008 | Fairy | |
| 2010/0244318 A1 | 9/2010 | Kobayashi et al. | |

FOREIGN PATENT DOCUMENTS

| | | |
|---|---|---|
| GB | 2321030 | 7/1998 |
| JP | 60166416 | 8/1985 |
| JP | 1286813 | 11/1989 |
| JP | 2008093957 | 4/2008 |

OTHER PUBLICATIONS

Extended European Search Report and Written Opinion in European Patent Application No. EP11192129, mailed Mar. 28, 2012.
Response to European Search Report and Written Opinion in European Patent Application No. EP11192129, dated Oct. 16, 2012.
Notification of Grant of Patent Right for Utility Model in Chinese Utility Model Patent Application No. CN201120493587.6, issued on Aug. 9, 2012.
Communication under Rule 71(3) EPC re Intention to Grant, issued Feb. 22, 2013 in European Patent Application No. 11192129.2.

* cited by examiner

*Primary Examiner* — Edmund H. Lee
(74) *Attorney, Agent, or Firm* — Plumsea Law Group, LLC

(57) ABSTRACT

Embodiments provide methods and systems for manufacturing a golf ball that precisely control the retraction of mold pins based on feedback sensor data, to avoid the formation of imperfections in the finished golf balls. An embodiment may involve holding a golf ball sub-part within a mold using at least one retractable mold pin; injecting molten molding material into the mold; detecting, during injection, operating conditions within the mold indicative of positions of the molten molding material relative to the at least one mold pin; and based on the detected operating conditions, retracting the at least one mold pin before the molten molding material reaches the at least one mold pin. Other embodiments may retract a mold pin after the molten material contacts the pin but within a duration suitably short enough to avoid undesirable part properties.

22 Claims, 9 Drawing Sheets

METHODS FOR MANUFACTURING A GOLF BALL

BACKGROUND

The present invention relates to golf ball manufacturing, and more particularly, to methods and systems of golf ball manufacturing that precisely control the retraction of mold pins based on feedback sensor data, to avoid the formation of imperfections in finished golf balls.

Conventional golf ball manufacturing techniques typically form layers of a golf ball by molding material around a sub-part, such as a solid core or a multilayered preformed golf ball portion. The molding material is typically a thermoplastic or thermoset material that is injection molded around the sub-part. The conventional injection molding techniques customarily use a two-part mold, with each part of the mold defining a hemispherical cavity. The two mold parts mate together with their cavities aligned to define the shape and size of the layer being formed over the sub-part. When the two mold parts are brought together, and before the molding material is injected, the sub-part of the golf ball is usually supported centrally within the cavities by retractable mold pins, leaving a mold cavity of uniform thickness in which to mold the outer layer over the sub-part. The mold pins typically have a pre-load or "pinch" against the sub-part to hold the sub-part in place. Molten molding material is then injected into the mold cavity through several gates. The molding material flowing from each of the gates surrounds the sub-part, converges, and fills the mold cavity between the golf ball sub-part and the mold. In filling the mold cavity, the molding material impinges on and surrounds the mold pins. Once the mold cavity is filled, but before the outer layer has completely hardened, the mold pins holding the sub-part retract so that the molding material may fill the voids left by the pins. The molding material then cools and hardens to form the outer layer, which may be an intermediate layer of the golf ball (e.g., an inner layer or mantle layer) or the cover of the golf ball.

In these conventional golf ball injection molding systems, the initially injected molten molding material fills the mold cavity and may contact and surround the mold pins before the mold pins are retracted. The pins must remain extended a duration sufficiently long enough to prevent movement of the sub-part during injection. In preventing this movement, however, when the pins are eventually retracted, the pins may leave gaps within the initially injected molten molding material. If the pins are held against the sub-part too long, the delay in filling the gaps with additional molten molding material may create a difference in cooling and hardening between the material in the gaps and the remaining material filling the mold cavity. Consequently, imperfections can form at or around the gaps left by the mold pins. For example, the retracting pins can leave cavities beneath the outer surface of the outer layer. In addition, fine cracks, "crows foot" marks, weld marks, and other boundary imperfections may be caused by the molten material flowing around the mold pins and forming knit lines or weld lines as the additional material fills the gap (e.g., circular space) vacated by a mold pin. Detrimentally, the imperfections around the mold pins may create weak spots on the finished ball and lead to premature cracking of the ball.

SUMMARY

Embodiments provide systems and methods for manufacturing a golf ball that precisely control the retraction of mold pins based on feedback sensor data, to avoid the formation of imperfections in the finished golf ball. The precise control may retract the mold pins as the injected molding material approaches the pins, after the golf ball sub-part is sufficiently held in place by the injected material, and before the molding material contacts the pins. Alternatively, the precise control may retract the mold pins after the material contacts the pins, but within a duration after that contact that is sufficiently short enough to provide an acceptable part. Accordingly, embodiments of the systems and methods may avoid the imperfections that would otherwise be caused by retraction of the pins from surrounding cooled and hardened molding material.

One aspect provides a method for manufacturing a golf ball, which may include positioning a golf ball sub-part within a mold, wherein a mold cavity is defined between the golf ball sub-part and the mold; holding the golf ball sub-part in the mold using at least one retractable mold pin; injecting molten molding material into the mold cavity; receiving feedback sensor data indicative of positions of a melt front of the molten molding material being injected into the mold cavity; retracting the at least one mold pin when feedback sensor data indicates a position of the melt front corresponding to a predetermined trigger point position; and filling the mold cavity with the molten molding material.

In another aspect, the feedback sensor data may comprise data measured by at least one of a temperature sensor and a pressure sensor.

In another aspect, retracting the at least one mold pin comprises retracting the at least one mold pin before the melt front contacts the at least one mold pin.

In another aspect, the predetermined trigger point position may be within approximately 5 mm of the at least one mold pin.

In another aspect, retracting the at least one mold pin comprises retracting the at least one mold pin within a duration after the melt front contacts the at least one mold that is sufficiently short enough to prevent imperfections in the golf ball.

In another aspect, the method may further comprise predetermining correlations between the feedback sensor data and positions of the melt front using one of calculations, empirical studies, and combinations thereof.

In another aspect, the feedback sensor data may comprise signals from a temperature sensor, and the feedback sensor data that indicates a position of the melt front corresponding to a predetermined trigger point position may comprise a detected temperature above a predetermined temperature.

In another aspect, the feedback sensor data may comprise signals from a pressure sensor, and the feedback sensor data that indicates a position of the melt front corresponding to a predetermined trigger point position may comprise a detected pressure above a predetermined pressure.

In another aspect, the method may further comprise positioning the pressure sensor on a portion of the at least one mold pin that is exposed to the mold cavity when the at least one mold pin is in an extended position and is covered when the at least one mold pin is in a retracted position.

In another aspect, the feedback sensor data may comprise signals from a sensor placed behind the at least one mold pin.

In another aspect, the at least one mold pin may comprise a first mold pin associated with a first temperature sensor and a second mold pin associated with a second temperature sensor, and the method may further comprise retracting the first mold pin at a first time when feedback sensor data of the first temperature sensor indicates a position of the melt front corresponding to a first predetermined trigger point position proximate to the first mold pin, and retracting the second mold pin at a second time when feedback sensor data of the second temperature sensor indicates a position of the melt front corresponding to a second predetermined trigger point position proximate to the second mold pin, wherein the first time and the second time are different.

In another aspect, the method may further comprise positioning a first temperature sensor proximate to the mold cavity and positioning a second temperature sensor proximate to the mold cavity, wherein the first temperature sensor may be disposed farther from the at least one mold pin than the second temperature sensor; detecting a first change in temperature by the first temperature sensor; detecting a second change in temperature by the second temperature sensor; and using the first change in temperature and the second change in temperature to determine a rate of movement of the melt front through the mold cavity toward the at least one mold pin.

In another aspect, the method may further comprise selecting a rate at which the at least one mold pin is retracted based on the rate of movement of the melt front.

In another aspect, the mold may define a spherical mold cavity. The molten molding material may be injected into the mold cavity at an equator of the spherical mold cavity. The at least one mold pin may comprise at least two mold pins. The at least two mold pins may be spaced equally apart from each other and may be each spaced an equal distance from a pole of the spherical mold cavity. The mold may comprise at least two temperature sensors spaced equally apart from each other and each spaced an equal distance from the pole of the mold cavity. The at least two temperature sensors may be spaced farther from the pole than the at least two mold pins. The feedback sensor data may be received from the at least two temperature sensors.

In another aspect, the at least two mold pins may comprise three mold pins disposed in an equilateral configuration centered around the pole of the spherical mold cavity. The at least two temperature sensors may comprise four temperature sensors arranged in a square configuration centered around the pole of the spherical mold cavity.

Another aspect provides a system for manufacturing a golf ball, which may comprise a mold, at least one mold pin, at least one feedback sensor, and a controller. The mold may define a spherical mold cavity configured to receive a golf ball sub-part and at least one gate through which to inject molten molding material. The at least one mold pin may be extendable into the spherical mold cavity and retractable from the spherical mold cavity, and may be configured to hold the golf ball sub-part within the mold. The at least one feedback sensor may detect operating conditions within the spherical mold cavity associated with movement of the injected molten molding material from the at least one gate to the at least one mold pin. The at least one feedback sensor may transmit feedback sensor signals corresponding to the operating conditions. The controller may receive a feedback sensor signal from the at least one feedback sensor, compare the feedback sensor signal to a predetermined trigger point, and retract the at least one mold pin from the spherical mold cavity if the feedback sensor signal meets the predetermined trigger point.

In another aspect, the controller may retract the at least one mold pin from the spherical mold cavity before the injected molten material reaches the at least one mold pin.

In another aspect, the at least one feedback sensor may comprise a first temperature sensor and a second temperature sensor. The first temperature sensor may be disposed farther from the at least one mold pin than the second temperature sensor. The controller may receive one or more signals indicating a first change in temperature by the first temperature sensor and a second change in temperature by the second temperature sensor. The controller may use the first change in temperature and the second change in temperature to determine a rate of movement of the injected molten molding material through the spherical mold cavity toward the at least one mold pin, and may retract the at least one mold pin at a rate based on the rate of movement of the melt front.

In another aspect, the at least one mold pin may comprise a first mold pin and a second mold pin. The at least one feedback sensor may comprise a first temperature sensor associated with the first mold pin and a second temperature sensor associated with the second mold pin. The controller may retract the first mold pin at a first time when a feedback signal of the first temperature sensor meets a first predetermined trigger point, and retract the second mold pin at a second time when a feedback signal of the second temperature sensor meets a second predetermined trigger point. The first time and the second time may be different.

In another aspect, the mold may define a gate at an equator of the spherical mold cavity. The at least one mold pin may comprise at least two mold pins. The at least two mold pins may be spaced equally apart from each other and may be each spaced an equal distance from a pole of the spherical mold cavity. The at least one feedback sensor may comprise at least two temperature sensors that are spaced equally apart from each other in the mold and are each spaced an equal distance from the pole of the spherical mold cavity. The at least two temperature sensors may be spaced farther from the pole than the at least two mold pins.

In another aspect, the at least one feedback sensor may comprise a pressure sensor that is disposed on a portion of the at least one mold pin that is exposed to the spherical mold cavity when the at least one mold pin is in an extended position and is covered when the at least one mold pin is in a retracted position.

In another aspect, the at least one feedback sensor is disposed behind the at least one mold pin.

Another aspect provides a method for manufacturing a golf ball, which may include holding a golf ball sub-part within a mold using at least one retractable mold pin; injecting molten molding material into the mold; detecting, during injection, operating conditions within the mold indicative of positions of the molten molding material relative to the at least one mold pin; and based on the detected operating conditions, retracting the at least one mold before the molten molding material contacts the at least one mold pin.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
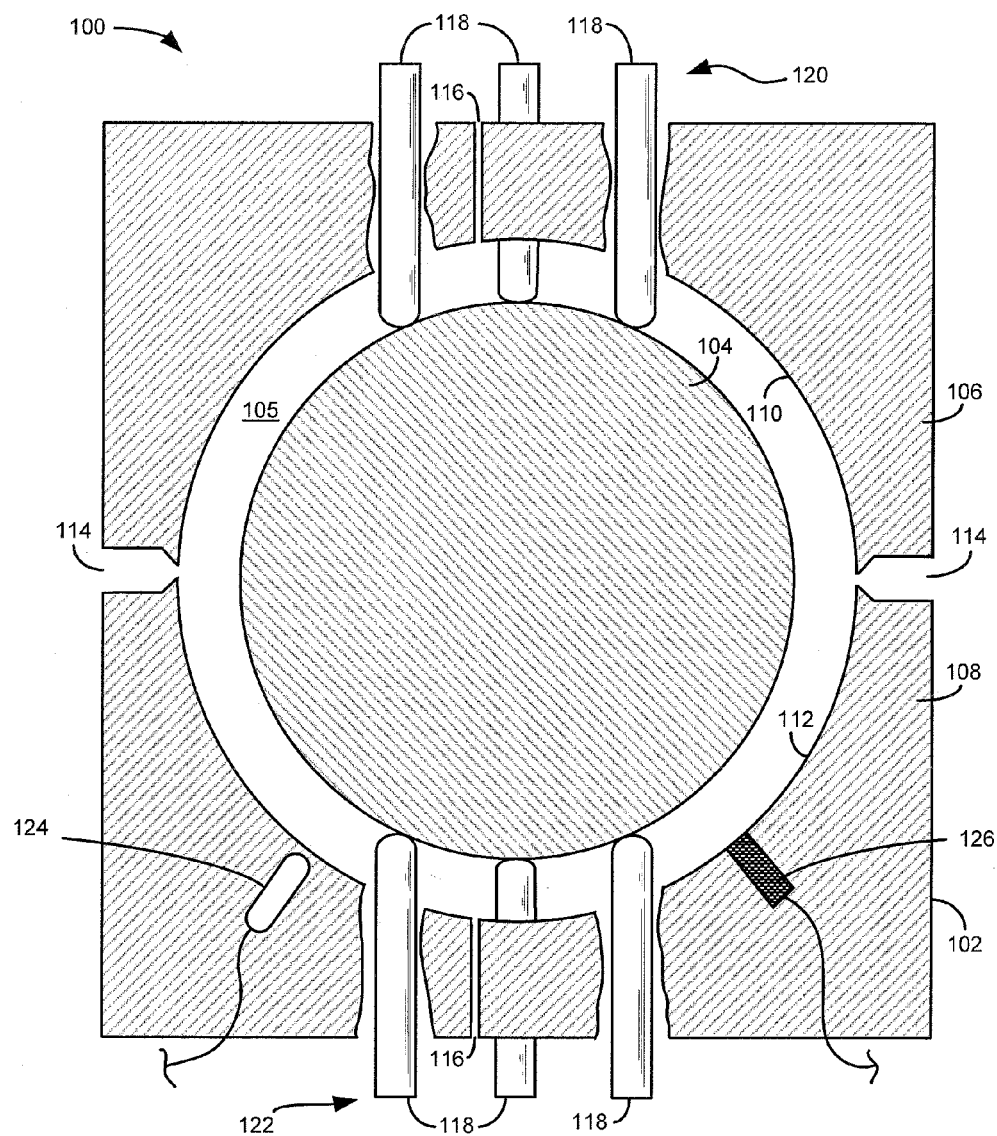
FIG. 1 is a schematic diagram illustrating a partial cross-sectional view of an embodiment of a system for manufacturing golf balls that precisely controls the retraction of mold pins based on feedback sensor data.

Embodiments provide systems and methods for manufacturing a golf ball that precisely control the retraction of mold pins based on feedback sensor data, to avoid the formation of imperfections in the finished golf ball. The precise control may retract the mold pins as the injected molding material approaches the pins, after the golf ball sub-part is sufficiently held in place by the injected material, and before the molding material contacts the pins. Alternatively, the precise control may retract the mold pins after the material contacts the pins, but within a duration after that contact that is sufficiently short enough to provide an acceptable part. Accordingly, embodiments of the systems and methods may avoid the imperfections that would otherwise be caused by retraction of the pins from surrounding cooled and hardened or partially-hardened molding material.

In precisely controlling the retraction of mold pins, embodiments may use feedback sensor techniques such as cavity pressure sensing and melt front detection. The feedback sensor data may be used to trigger the movement of the mold pins, for example, before the melt front and the ensuing melt reach the mold pins. The feedback sensor data therefore may reflect the actual conditions of the molding material during injection, which may enable the precisely timed retraction of the mold pins so as to prevent structural imperfections.

In one embodiment using melt front detection, mold pins are retracted when the melt front reaches a designated detection point within the mold cavity. The detection point may be selected so that the melt front itself never reaches the mold pins prior to retraction, to avoid the formation of imperfections such as weld marks. In an embodiment using cavity pressure sensing, the mold pins may be retracted when the pressure in the mold reaches a designated threshold pressure.

In another embodiment, both melt front detection and also cavity pressure sensing are used. Thus, melt front detection and cavity pressure sensing may be used to precisely time the retraction of the mold pins.

The use of feedback sensor data may also beneficially accommodate normal manufacturing variances to adjust the retraction of the mold pins for actual operating conditions. During the course of a production run, variations in material, hydraulic oil temperature, factory air temperature, sub-part dimensions, and other process variables may cause the behavior of the melt front to vary between injection runs. For example, as the temperature of the tooling equipment increases from initial injection runs at start-up to subsequent runs, the melt front may move more quickly within a mold cavity between a mold and sub-part, and reach positions near the mold pins sooner. The use of feedback sensor data, such as cavity pressure sensing data and melt front detection data, therefore may compensate for any changes in the way the molten molding material behaves and may be used to control the retraction of the mold pins based on the actual position of the molten molding material. Accordingly, embodiments may produce higher quality parts that are less likely to prematurely crack or otherwise fail.

FIG. 1 illustrates an embodiment of a system 100 for manufacturing golf balls that precisely controls the retraction of mold pins based on feedback sensor data. As shown, system 100 may include a mold 102 configured to receive a golf ball sub-part 104, which may be, for example, a solid core or a multi-layered portion of a golf ball. As used herein, the term "sub-part" refers to a portion of a structure underlying another portion of the structure. For example, in a golf ball, a sub-part may be any portion under the outermost layer or cover, such as an intermediate layer or a core.

Mold 102 may be constructed of multiple portions that may be displaced relative to each other and may be brought together to define a molding chamber for the golf ball sub-part 104. For example, as shown in the embodiment of FIG. 1, mold 102 may be a two-part mold having an upper portion 106 and a lower portion 108. Upper portion 106 and lower portion 108 may have interior walls 110, 112, respectively, defining hemispherical cavities that align with each other and, when brought together, define a spherical molding chamber. The interior walls of mold 102 may include surface features that define corresponding surface features in the layer molded around the golf ball sub-part 104. For example, in the case of an outer layer that is a cover, the surface features of the molded layer may be a dimple pattern.

Mold 102 may also define gates 114 through which molten molding material may be injected into the mold cavity 105 between the golf ball sub-part 104 and the spherical molding chamber defined by the mold 102. Although the cross-sectional view of FIG. 1 shows two gates 114, any number of gates may be used, including one or more than two. Multiple gates may be used to promote better distribution of the molten molding material throughout the mold cavity 105, to avoid, for example, undesirable differences in cooling and hardening in different areas of the mold cavity 105. Mold 102 may also include vents 116 to allow air in the mold cavity 105 to escape so that the molten molding material may flow throughout the mold cavity 105.

In one embodiment, the molding material may be injected into the mold in liquid form, and then allowed to cool and solidify. In the case of an outer layer that is a cover, the molten molding material may be formed from a material such as SURLYN® as produced by E. I. DuPont de Nemours of Wilmington, Del. In the case of an outer layer that is an intermediate layer of a golf ball, the molding material may be, for example, an elastomer, thermoset material, or a thermoplastic material. A suitable thermoset elastomer may be, for example, a cross-linked rubber such as polybutadiene, which may be chemically cross-linked with zinc diacrylate and/or similar cross-linking agents. A suitable thermoplastic material may be, for example, a thermoplastic polyurethane or an ionomer resin, such as the highly neutralized ionomer resins developed by E. I. DuPont de Nemours.

System 100 may also include provisions for holding golf ball sub-part 104 in place during injection molding. These provisions preferably hold the golf ball sub-part 104 centered within the spherical molding chamber defined by the mold 102 to provide a uniform distance between the outer surface of the golf ball sub-part 104 and the interior walls 110, 112 of the mold 102. With the golf ball sub-part 104 centered, the mold cavity 105 between the golf ball sub-part 104 and mold 102 has of a uniform thickness in which to mold the outer layer over the sub-part 104.

Figure 2:
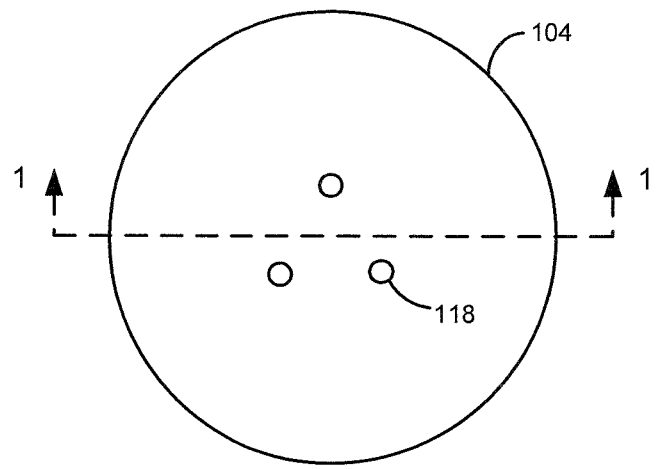
FIG. 2 is a schematic diagram illustrating a top view of an embodiment of a golf ball sub-part and a triangular configuration of mold pins, with the line 1-1 representing the line along which the cross-sectional view of FIG. 1 is taken.

In one embodiment, the provisions for holding the golf ball sub-part 104 may include one or more retractable mold pins. The mold pins may be pre-loaded so as to apply a force against the golf ball sub-part 104. The mold pins may also be positioned around the sub-part 104 to pinch the sub-part 104 and hold it in place. As an example, as shown in the partial cross-sectional view of FIG. 1, system 100 may include six mold pins 118, with a first set 120 of three of the mold pins positioned on a first side of the sub-part 104 and a second set 122 of three of the mold pins positioned on a second side of the sub-part 104 opposite to the first side. The mold pins of each set of mold pins may be spaced equally apart. For example, in FIG. 1, the first set 120 of three mold pins 118 may be arranged such that a center point of each mold pin aligns with a different vertex of an equilateral triangle. The second set 122 of three mold pins 118 may be similarly arranged and located directly opposite to the mold pins 118 of the first set 120, as shown in FIG. 1. FIG. 2 shows an exemplary triangular configuration of the first set 120 of mold pins 118, with the line 1-1 representing the line along which the cross-sectional view of FIG. 1 is taken.

In another embodiment, two mold pins may be used. The two mold pins may be diametrically positioned with respect to the golf ball sub-part 104. Opposing each other along a diameter of the sub-part 104, the two mold pins may pinch and hold the sub-part 104 in place.

In embodiments, a mold pin may be retractable so that the mold pin can move from a first position in which the distal end of the mold pin contacts the golf ball sub-part 104, as shown in FIG. 1, to a second position in which the distal end of the mold pin is separated from the surface of the sub-part 104. In the second retracted position, the distal end of the mold pin may extend into the mold cavity 105 between the sub-part 104 and mold 102, may be flush with surface of an interior wall (e.g., interior wall 110 or 112) of the mold 102, or may be below the surface of an interior wall and within the mold 102. A mold pin may be configured to gradually retract from a first contacting position to a second retracted position, or may be configured to retract rapidly or nearly instantaneously. The rate at which a mold pin may be retracted may depend on factors such as the flow characteristics of an injected molten molding material, including, for example, the speed at which a melt front moves.

In the case of multiple mold pins, the mold pins may be configured to retract simultaneously at the same rate of movement. In one embodiment, multiple mold pins may be connected to a single actuator that moves all of the mold pins at the same time and at the same speed. Alternatively, multiple mold pins may be separately actuated such that the mold pins are able to move independently of each other, at different times, and at different speeds.

To precisely control the retraction of mold pins, system 100 may also include sensors that provide feedback data on conditions of the injection molding process. These sensors may include, for example, temperature sensors and cavity pressure sensors (e.g., transducers). In one embodiment, shown in FIG. 1, system 100 includes a temperature sensor 124 and a pressure sensor 126. As shown, temperature sensor 124 may be encased within a portion 108 of the mold 102 and positioned near an interior wall 112. Alternatively, temperature sensor 124 may also be exposed to the mold cavity 105. Temperature sensor 124 may be positioned and configured to detect changes in temperature occurring as a result of molten molding material traveling through mold cavity 105. As also shown, pressure sensor 126 may be disposed at an interior wall 112 of the mold to detect changes in pressure within mold cavity 105 as the molten molding material moves through the mold cavity 105.

Figure 3:
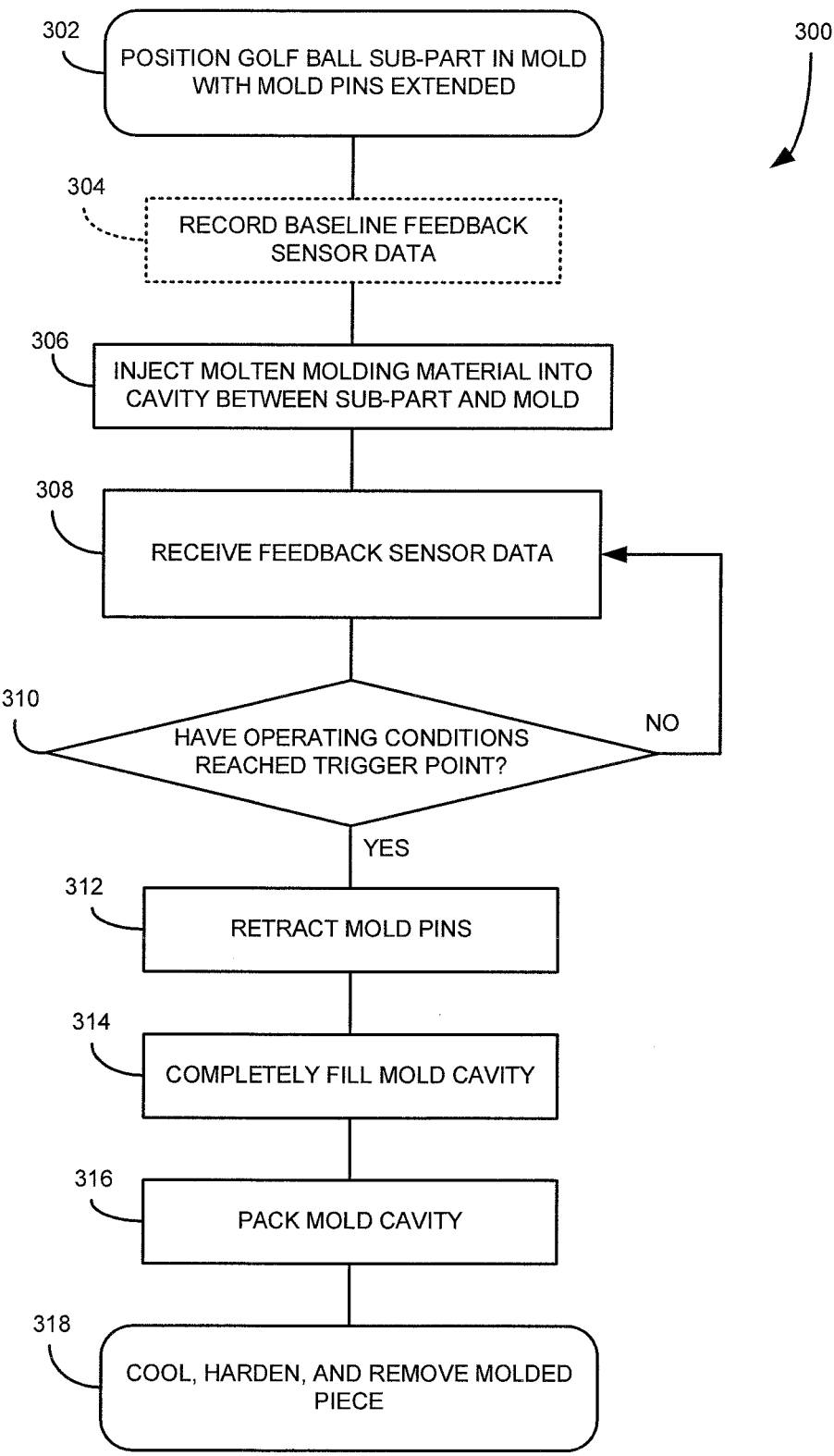
FIG. 3 is a flowchart illustrating an embodiment of a method for manufacturing a golf ball.

With continuing reference to the exemplary system 100 of FIG. 1, an embodiment provides a method for manufacturing a golf ball that precisely controls the retraction of mold pins based on actual conditions of the injection molding process, as monitored by feedback sensors. As one example, the flow-chart of FIG. 3 illustrates an embodiment of a method 300 for manufacturing a golf ball. As shown, method 300 may begin at step 302 by positioning a golf ball sub-part 104 in a mold 102 with mold pins 118 of the mold 102 extended. In this extended position, mold pins 118 may hold the sub-part 104 centrally within a spherical chamber defined by the mold 102. At this point, mold pins 118 may also apply a force to the sub-part 104 sufficient to hold the sub-part 104 in place and resist the pressures and forces associated with the injection of molding material into the mold 102.

With the golf ball sub-part 104 in place, method 300 may continue in step 304 by optionally (as represented by the dashed lines in FIG. 3) recording baseline feedback sensor data from one or more sensors, for example, as determined by temperature sensors or pressure sensors. The baseline data may reflect the conditions of the mold before injection molding begins, or may reflect the conditions of the mold in between successive injection molding runs. The baseline feedback sensor data may facilitate more accurate detection and calculation of operating conditions during injection molding, as discussed below.

Method 300 may continue in step 306 by injecting molten molding material into the mold cavity 105 between the sub-part 104 and the mold 102. The molten molding material may enter the mold cavity through one or more gates in the mold, such as is represented by the gates 114 in FIG. 1. The gates may be positioned at various locations around the mold 102 to evenly distribute the molten molding material. In addition, the gates may be positioned at the farthest possible locations from the mold pins, so that the mold pins may remain extended for the longest possible time while the molten molding material is injected. For example, as shown in FIG. 1, gates 114 may be positioned at the equator of the golf ball sub-part 104, with the mold pins 118 positioned at or near the north and south poles.

Figure 4:
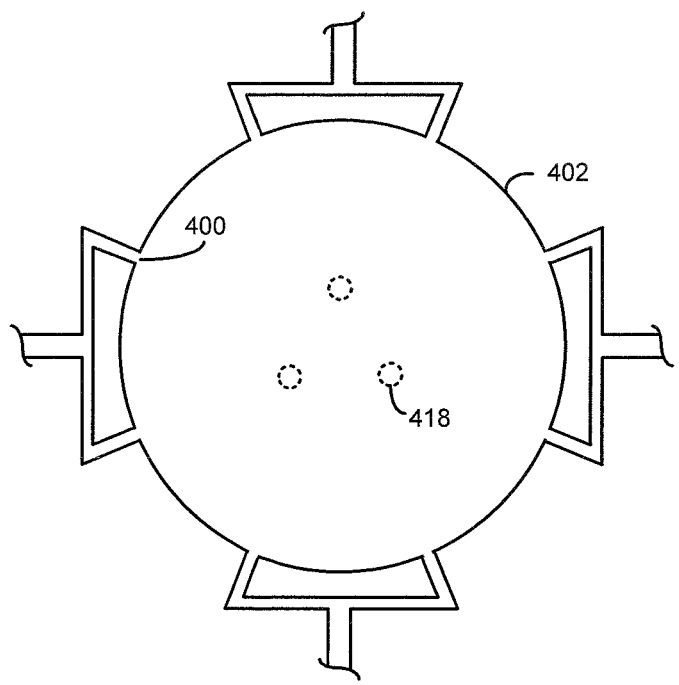
FIG. 4 is a schematic diagram illustrating an embodiment of a configuration of gates and mold pins of a mold.
Figure 5:
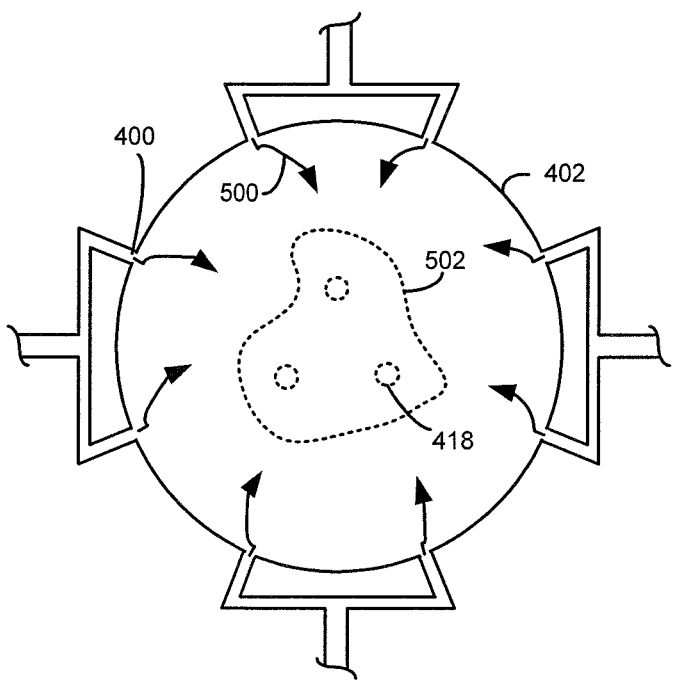
FIG. 5 is a schematic diagram illustrating an embodiment of a molten molding material flow through the mold of FIG. 4, showing the melt front of the flowing molten molding material approaching the mold pins.

As one embodiment, FIG. 4 schematically illustrates an exemplary configuration of gates and mold pins. As shown, a mold may have multiple gates 400 spaced equally around a spherical molding chamber 402. The gates 400 may be eight in total and may be positioned at the equator of the spherical chamber 402. For clarity, FIG. 4 does not depict the golf ball sub-part, which would, for example, be centered within the chamber 402. As represented by the dashed lines, mold pins 418 may be positioned at a north or south pole of the chamber 402, relative to the gates 400 positioned at the equator. Thus, molten molding material entering chamber 402 through gates 400 may flow within the mold cavity between the golf ball sub-part and the chamber 402 from the gates 400 in a direction toward the mold pins 418. FIG. 5 illustrates an embodiment of this flow represented by the arrows 500, and showing the melt front 502 of the flowing molten molding material approaching the mold pins 418.

As the injected molten molding material flows through the mold gates and toward the mold pins, method 300 may continue in step 308 by receiving feedback sensor data associated with the actual operating conditions of the injection molding. As discussed above, the feedback sensor data may be provided, for example, by temperature sensors or pressure sensors. This feedback may preferably be indicative of the position of the molten molding material within the mold cavity between the golf ball sub-part and the mold, and specifically, of the distance between the mold pins and the melt front of the molten molding material. For example, in the case of a temperature sensor placed at a point proximate to the mold pins, a detected change in temperature may indicate that the melt front has reached that point. As another example, in the case of a cavity pressure transducer placed at a point proximate to the mold pins, or inside a perimeter defined by multiple mold pins, a detected change in pressure may indicate that the melt front has reached a point near the mold pins.

In embodiments, the relationship between feedback sensor data and the position of the melt front may be pre-determined by calculation, empirical studies, or combinations of those approaches. Thus, any particular value measured by a feedback sensor may be correlated to a position of the melt front. A trigger point may then be predetermined, which represents the point at which the mold pins are retracted. Preferably, the trigger point corresponds to a location of the melt front as close to the mold pins as possible, so that the mold pins may maintain a holding force on the golf ball sub-part as long as possible so as to avoid movement of the sub-part during molding. Such movement may cause the sub-part to be off center or may cause structural imperfections in the sub-part and/or outer layer, such as cavities, cracks, or weld lines. Also preferably, the trigger point may prevent any contact between the melt front and the mold pins, so that imperfections caused by contact with the mold pins, and subsequent retraction of the mold pins, may be avoided. In one embodiment, the trigger point corresponds to a location of the melt front within approximately 5 mm from a mold pin. In alternative embodiments, the trigger point may allow contact between the melt front and the mold pins, but limit the duration of that contact sufficiently enough to avoid imperfections.

With a trigger point established, method 300 may continue in step 310 by comparing received feedback sensor data to the pre-determined trigger point. As shown by the decision block of step 310, if the operating conditions represented by the feedback sensor data have not reached the trigger point, then the method may return to step 308 to receive new feedback sensor data. The method may then return to step 310 to determine whether the operating conditions have reached the trigger point in view of the new feedback sensor data. If the operating conditions have still not reached the trigger point, the method continues through the loop between steps 308 and 310, receiving feedback sensor data and evaluating actual operating conditions against the trigger point. The feedback sensor data may be continuously, or near-continuously, monitored, or may be received at pre-determined intervals appropriate for the timing of the injection of molten molding material and the corresponding timing of changes in operating conditions.

In step 310, when the operating conditions, as reflected by the feedback sensor data, have reached the trigger point, method 300 may continue by retracting the mold pins as shown in step 312. The mold pins may be retracted gradually or rapidly or nearly instantaneously, depending upon, for example, the rate at which the melt front is approaching the mold pins. As discussed above, in the case of multiple mold pins, all of the mold pins may be retracted at the same time and the same speed. Or, alternatively, individual mold pins may be retracted at different times and/or speeds. In embodiments, each mold pin of a plurality of mold pins may be associated with a different feedback sensor, so as to control only that particular mold pin. For example, a first mold pin may be paired with a first temperature sensor and a second mold pin may be paired with a second different temperature sensor. When a first trigger point is reached based on signals received from the first temperature sensor, the first mold pin may be retracted, independently of the second mold pin and the signals received from the second temperature sensor. Correspondingly, when the second trigger point is reached based on signals received from the second temperature sensor, the second mold pin may be retracted, independently of the first mold pin and the signals received from the first temperature sensor.

Figure 6:
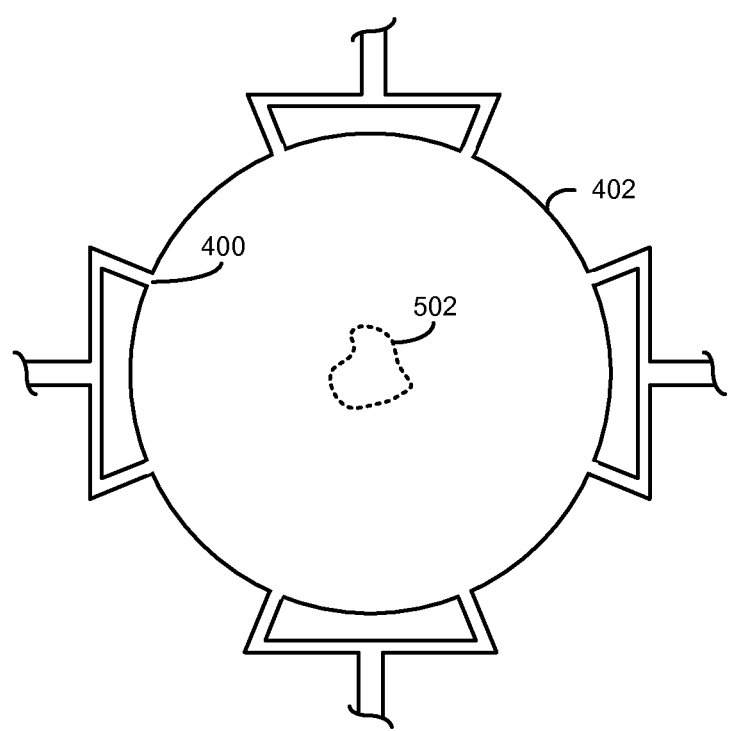
FIG. 6 is a schematic diagram illustrating an embodiment of a molten molding material flow through the mold of FIG. 4, showing the mold pins retracted and the melt front converging on itself at the north pole of the spherical chamber, to fill up the mold cavity.

After the mold pins are retracted, method 300 may continue in step 314 by completely filling the mold cavity between the golf ball sub-part and the mold with the molten molding material. FIG. 6 illustrates an embodiment of this stage, with the mold pins retracted and the melt front 502 converging on itself at the north pole of the spherical chamber, to fill up the mold cavity.

Once the mold cavity is full, method 300 may continue in step 316 by packing the molten molding material into the mold cavity under pressure. This packing may ensure that all air escapes through the vents 116 and that the molten molding material is compressed sufficiently and is forced against the golf ball sub-part for proper adhesion and against the mold for proper shaping.

After the molten molding material is packed into the mold cavity, method 300 may conclude in step 318 by allowing the layer molded around the sub-part to cool and harden sufficiently enough for the piece to be removed from the mold. The molded piece may then be removed from the mold. The molded piece may be a golf ball requiring only finishing, such as paint and clear coating, or may be a sub-part over which additional layers are to be applied.

In the exemplary method 300, because the mold pins are retracted before or shortly after the melt front contacts the mold pins, the imperfections associated with such contact are avoided, as discussed above. To provide the optimal balance between the competing objectives of maintaining the mold pins' hold on the sub-part to avoid movement and of retracting the mold pins to avoid or limit contact with the melt front and the resulting possible imperfections, embodiments may precisely time the retraction of the mold pins with respect to the relative position of the melt front, for example, retracting the mold pins just before the melt front reaches the mold pins. In this respect, embodiments may include provisions for increasing the sensitivity of the detected feedback sensor data. For example, embodiments may include multiple sensors and particularly placed sensors. Multiple sensors may be configured and located to detect the progression of a melt front through a mold cavity.

Figure 7:
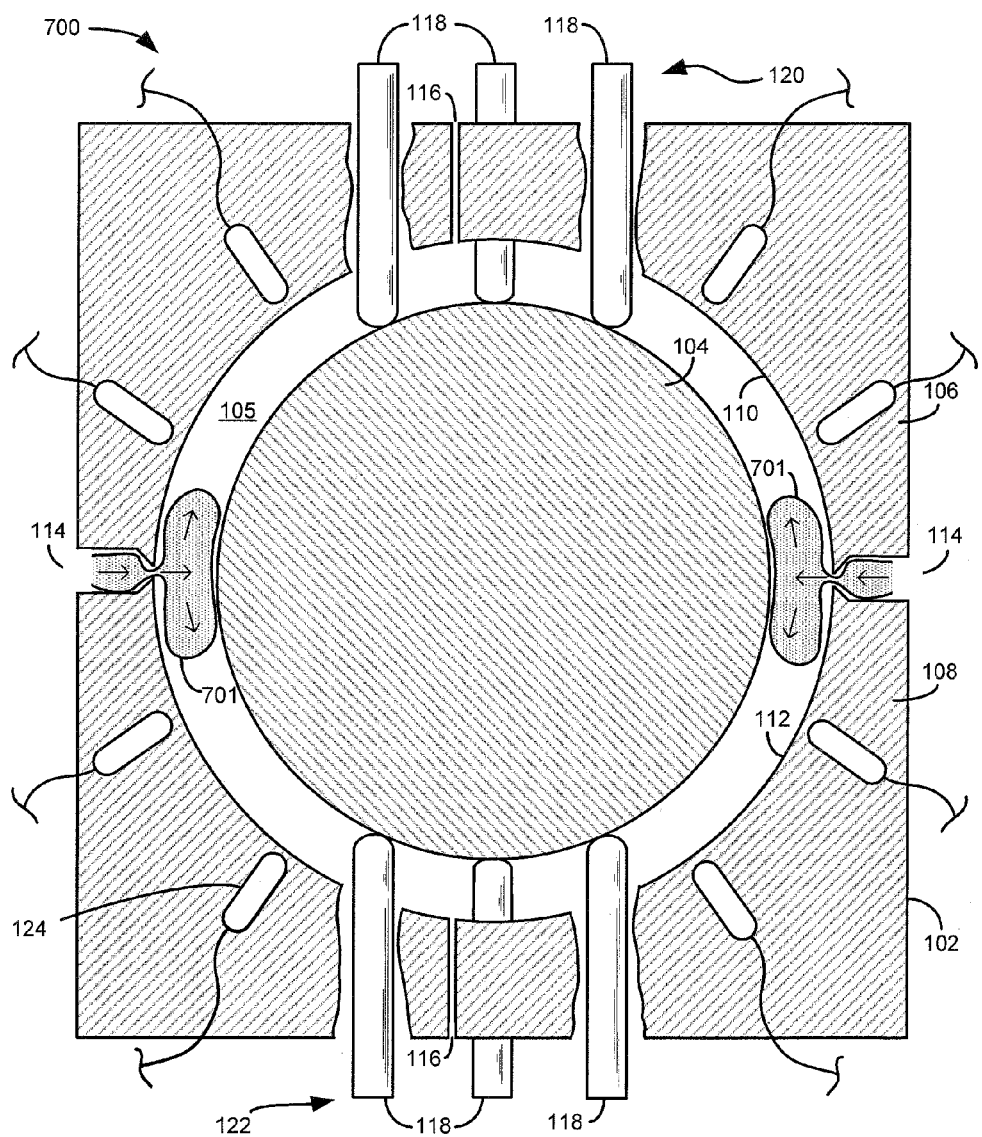
FIG. 7 is a schematic diagram illustrating an embodiment of a golf ball injection molding system using multiple distributed sensors to detect the progression of a melt front through a mold cavity.

As one example, FIG. 7 illustrates an embodiment of a system 700 using multiple distributed sensors to detect the progression of a melt front through a mold cavity. As shown in the cross-sectional view of FIG. 7, system 700 may include multiple temperature sensors 124 between the gates 114 and the mold pins 118. The temperature sensors 124 may detect changes in temperature, which may be indicative of the passage of the molten molding material 701 through the mold cavity 105. Due to their placement, the temperature sensors 124 closest to the gates 114 and farthest from the mold pins 118, may detect changes before those farthest from the gates 114 and closest to the mold pins 118. Consequently, the location of the melt front at any particularly time may be more accurately determined in comparison to the use of a single temperature sensor. In addition, the rate of the melt front movement may also be determined by comparing signals received from successive temperature sensors. The rate of melt front movement may be used to select or adjust the rate at which a mold pin is retracted. For instance, if the melt enters the mold cavity at 1.5 cubic inches per second and increases to 1.75 cubic inches per second, then the rate of pin retraction may be increased relative to the percentage change in melt flow rate.

Figure 8:
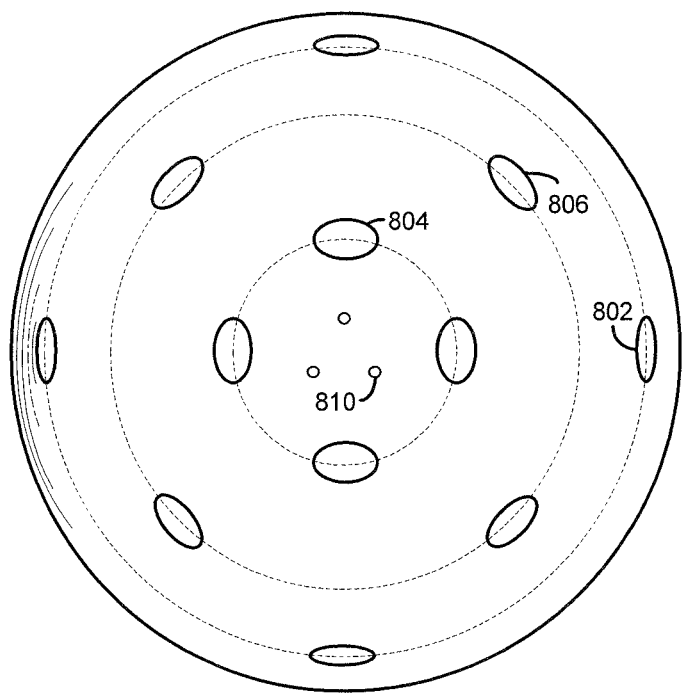
FIG. 8 is a schematic diagram illustrating an embodiment of groups of temperature sensors located around a spherical mold chamber at different latitudinal lines and spaced evenly apart longitudinally.

Although the cross-sectional view of FIG. 7 illustrates temperature sensors 124 placed along the same longitudinal line of a spherical mold chamber, embodiments may also distribute sensors in a latitudinal direction. As one example, FIG. 8 schematically illustrates groups of temperature sensors located around a spherical mold chamber at different latitudinal lines and spaced evenly apart longitudinally. The groups of sensors are represented by the dashed circles in FIG. 8. As shown, a first group 802 of temperature sensors is positioned nearest the equator, a second group 804 of temperature sensors is positioned farthest from the equator and nearest the mold pins 810, and a third group 806 of temperature sensors is positioned latitudinally in between the first group 802 and the second group 804. The distribution of the sensors in each of the groups of temperature sensors may also be angularly offset from one another, for example, as shown by the 45 degree offsets in FIG. 8. Although the groups of sensors shown in FIG. 8 include four sensors, any number of sensors may be used in a group. As evident from the exemplary distribution of sensors in FIG. 8, using multiple sensors may beneficially accommodate irregularly moving melt fronts, for example, melt fronts that do not converge concentrically around the mold pins 810. Accordingly, the mold pins 810 may be more accurately retracted relative to the approaching molten molding material, for example, retracting a mold pin right before the molten molding material would contact a mold pin.

Figure 9:
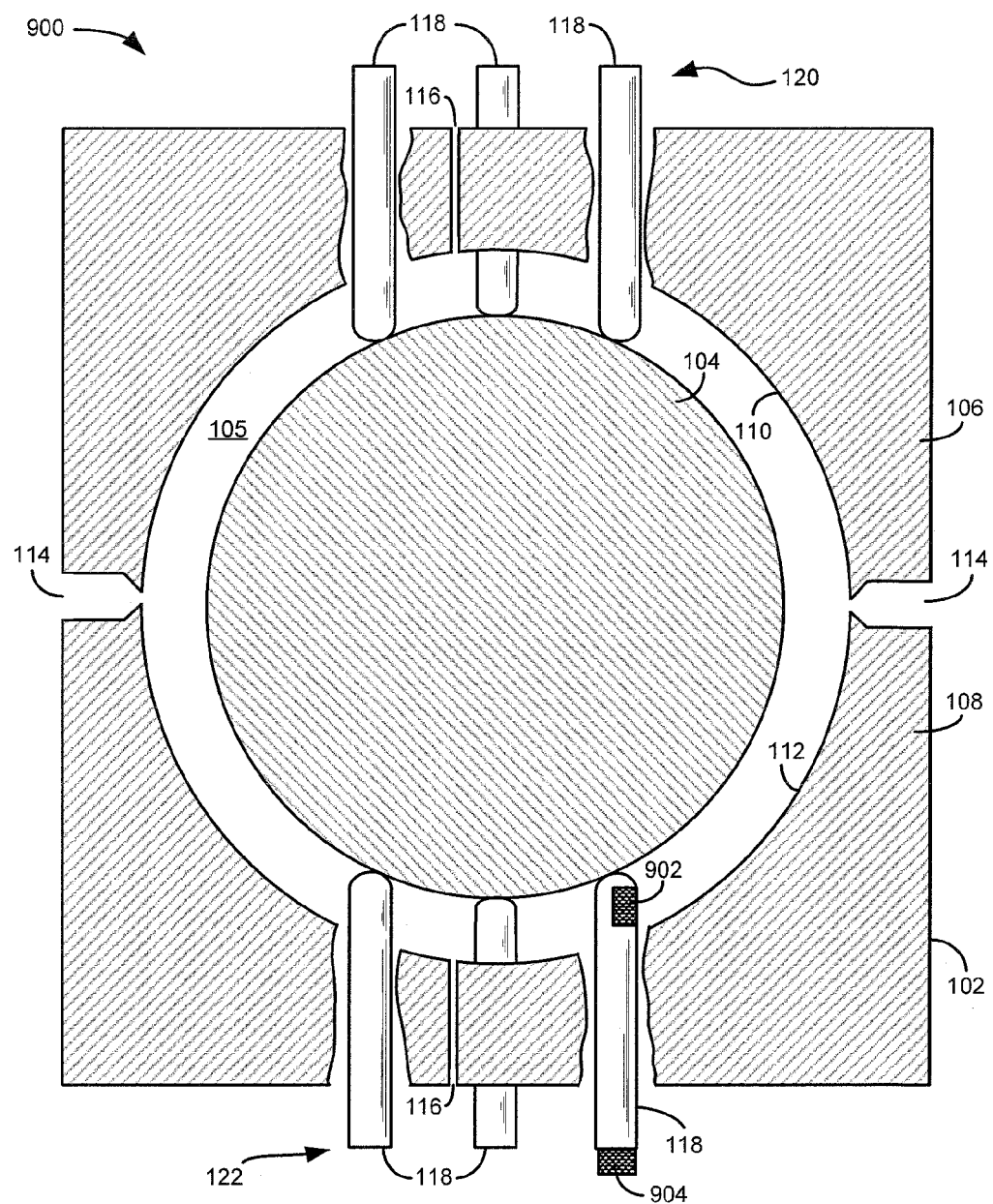
FIG. 9 is a schematic diagram illustrating an embodiment of a golf ball injection molding system in which a pressure sensor is disposed in a portion of a retractable mold pin that is exposed to the mold cavity when the mold pin is extended and is not exposed when the mold pin is retracted.

Embodiments may also place sensors on the mold pins, instead of, or in addition to, sensors placed in the mold. As an example, FIG. 9 illustrates an embodiment of a system 900 in which a sensor 902 is disposed in a portion of a mold pin 118 that is exposed to the mold cavity 105 when the mold pin 118 is extended, but is not exposed to the mold cavity 105 when the mold pin 118 is retracted. Sensor 902 may be a pressure sensor, for example. Placing the sensor at the mold pin 118 may avoid inconsistencies in sensor performance that may occur due to the molten molding material contacting the sensor. The mold pin 118 may be configured to retract when a predetermined trigger point is reached, before the molten molding material contacts the mold pin 118. For example, if sensor 902 is a pressure sensor, the mold pin 118 may retract when the pressure reaches the trigger point so that the pressure sensor does not contact the molten molding material. Although FIG. 9 shows one sensor in a mold pin, more than one mold pin may have a sensor.

Embodiments may also place sensors behind the mold pins 118, instead of, or in addition to, sensors placed in the mold and on the mold pins. As an example, FIG. 9 shows an embodiment of a sensor 904 placed behind mold pin 118. In this configuration, a sensor may not be directly exposed to the molten molding material in the mold cavity 105. A sensor placed behind a mold pin may detect conditions within the mold cavity 105 through the mold pin. For example, in the case of a temperature sensor placed behind a mold pin, the temperature sensor may detect a temperature within the mold cavity 105 via conduction through the mold pin. As another example, a pressure sensor placed behind a mold pin may detect pressure through the mold pin.

Figure 10:
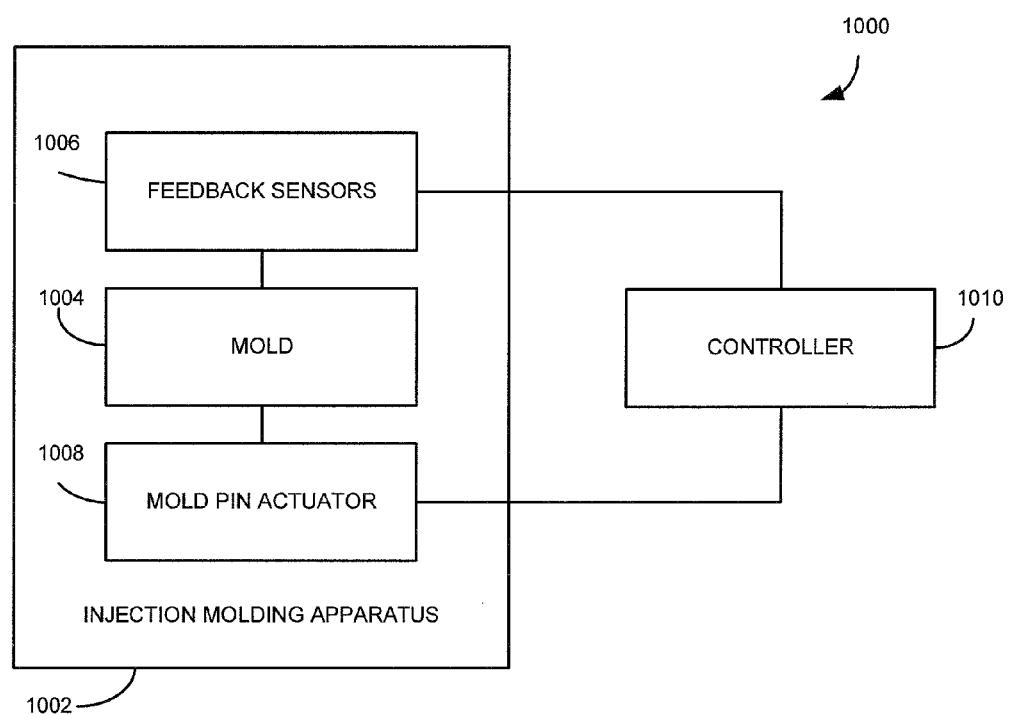
FIG. 10 is a schematic diagram illustrating an embodiment of a system for controlling mold pins based on feedback sensor data.

FIG. 10 schematically illustrates a system 1000 for controlling mold pins based on feedback sensor data. As shown, system 1000 includes an injection molding apparatus 1002, which includes a mold 1004, one or more feedback sensors 1006, and a mold pin actuator 1008. System 1000 also includes a controller 1010, which may be, for example, an application specific integrated circuit (ASIC), an electronic circuit, a processor (shared, dedicated, or group) and memory that executes one or more software or firmware programs, a combinational logic circuit, a computer, and/or other suitable components that provide the described functionality. Although shown in this embodiment as separate from molding apparatus 1002, controller 1010 may alternatively be integral to apparatus 1002. As shown, controller 1010 may be in communication with sensors 1006 and mold pin actuator 1008. Based on feedback signals received from sensors 1006, controller 1010 may transmit control signals to mold pin actuator 1008, commanding actuator 1008 to retract the mold pins after the trigger point is reached, as described above. Controller 1010 may be programmed or otherwise configured to receive feedback signals from sensors 1006, to calculate or otherwise analyze the signals with respect to the trigger point, and to send a command signal to the mold pin actuator 1008 to retract the mold pins of mold 1004.

In a further embodiment, a feedback sensor may be a moisture sensor. The feedback sensor data may comprise signals from the moisture sensor. The feedback sensor data that indicates a position of the melt front corresponding to a predetermined trigger point position may comprise a detected moisture above a predetermined moisture. As an example, in the case of a moisture sensor placed at a point proximate to the mold pins, or inside a perimeter defined by multiple mold pins, a detected change in humidity may indicate that the melt front has reached a point near the mold pins.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method and/or process should not be limited to the performance of their steps in the order written, and one skilled in the art can readily appreciate that the sequences may be varied and still remain within the spirit and scope of the present invention.

What is claimed is:

1. A method for manufacturing a golf ball comprising:
    positioning a golf ball sub-part within a mold, wherein a mold cavity is defined between the golf ball sub-part and the mold;
    positioning a first temperature sensor proximate to the mold cavity;
    positioning a second temperature sensor proximate to the mold cavity, wherein the first temperature sensor is disposed farther from the at least one mold pin than the second temperature sensor;
    holding the golf ball sub-part in the mold using at least one retractable mold pin;
    injecting molten molding material into the mold cavity;
    detecting a first change in temperature by the first temperature sensor;
    detecting a second change in temperature by the second temperature sensor;
    using the first change in temperature and the second change in temperature to determine a rate of movement of the melt front through the mold cavity toward the at least one mold pin
    receiving feedback sensor data indicative of the rate of movement of a melt front of the molten molding material being injected into the mold cavity;
    retracting the at least one mold pin when the feedback sensor data indicates a position of the melt front corresponding to a predetermined trigger point position; and
    filling the mold cavity with the molten molding material.

2. The method of claim 1, wherein the feedback sensor data further comprises data measured by a pressure sensor.

3. The method of claim 1, wherein retracting the at least one mold pin comprises retracting the at least one mold pin before the melt front contacts the at least one mold pin.

4. The method of claim 3, wherein the predetermined trigger point position is within approximately 5 mm of the at least one mold pin.

5. The method of claim 1, wherein retracting the at least one mold pin comprises retracting the at least one mold pin within a duration after the melt front contacts the at least one mold pin that is sufficiently short enough to prevent imperfections in the golf ball.

6. The method of claim 1, further comprising predetermining correlations between the feedback sensor data and the rate of movement of the melt front using one of calculations, empirical studies, and combinations thereof.

7. The method of claim 1, wherein the feedback sensor data that indicates a position of the melt front corresponding to a predetermined trigger point position comprises a detected temperature above a predetermined temperature.

8. The method of claim 2, wherein the feedback sensor data that indicates a position of the melt front corresponding to a predetermined trigger point position further comprises a detected pressure above a predetermined pressure.

9. The method of claim 8, further comprising positioning the pressure sensor on a portion of the at least one mold pin that is exposed to the mold cavity when the at least one mold pin is in an extended position and is covered when the at least one mold pin is in a retracted position.

10. The method of claim 1, wherein the feedback sensor data comprise signals from a sensor placed behind the at least one mold pin.

11. The method of claim 1, wherein the at least one mold pin comprises a first mold pin and a second mold pin, and wherein the method further comprises:
    retracting the first mold pin at a first time when a rate of movement of the melt front indicated by the feedback sensor data indicates a position of the melt front corresponding to a first predetermined trigger point position proximate to the first mold pin; and
    retracting the second mold pin at a second time when a rate of movement of the melt front indicated by the feedback sensor data indicates a position of the melt front corresponding to a second predetermined trigger point position proximate to the second mold pin,
    wherein the first time and the second time are different.

12. The method of claim 1, further comprising selecting a rate at which the at least one mold pin is retracted based on the rate of movement of the melt front.

13. A method for manufacturing a golf ball comprising:
    positioning a golf ball sub-part within a mold, wherein a mold cavity is defined between the golf ball sub-part and the mold;
    holding the golf ball sub-part in the mold using at least one retractable mold pin;
    injecting molten molding material into the mold cavity;
    receiving feedback sensor data indicative of a rate of movement of a melt front of the molten molding material being injected into the mold cavity;
    retracting the at least one mold pin when the feedback sensor data indicates a position of the melt front corresponding to a predetermined trigger point position; and
    filling the mold cavity with the molten molding material,
    wherein the mold defines a spherical mold cavity,
    wherein the molten molding material is injected into the mold cavity at an equator of the spherical mold cavity,
    wherein the at least one mold pin comprises at least two mold pins,
    wherein the at least two mold pins are spaced equally apart from each other and are each spaced an equal distance from a pole of the spherical mold cavity,
    wherein the mold comprises at least two temperature sensors that are spaced equally apart from each other and are each spaced an equal distance from the pole of the mold cavity, wherein the at least two temperature sensors are spaced farther from the pole than the at least two mold pins, and
    wherein the feedback sensor data is received from the at least two temperature sensors.

14. The method of claim 13, wherein the at least two mold pins comprise three mold pins disposed in an equilateral configuration centered around the pole of the spherical mold cavity, and wherein the at least two temperature sensors comprise four temperature sensors arranged in a square configuration centered around the pole of the spherical mold cavity.

15. A method for manufacturing a golf ball comprising:
    positioning a golf ball sub-part within a mold, wherein a mold cavity is defined between the golf ball sub-part and the mold;
    holding the golf ball sub-part in the mold using at least one retractable mold pin;
    injecting molten molding material into the mold cavity;
    receiving feedback sensor data indicative of a rate of movement of a melt front of the molten molding material being injected into the mold cavity;

retracting the at least one mold pin when the feedback sensor data indicates a position of the melt front corresponding to a predetermined trigger point position; and filling the mold cavity with the molten molding material, wherein the mold defines a spherical mold cavity, wherein the molten molding material is injected into the mold cavity at an equator of the spherical mold cavity, wherein the mold comprises at least two first temperature sensors that are spaced substantially equally apart from each other along a first latitudinal line and are each spaced substantially an equal distance from a pole of the spherical mold cavity, wherein the first latitudinal line is spaced farther from the pole than the at least one mold pin, wherein the mold comprises at least two second temperature sensors that are spaced substantially equally apart from each other along a second latitudinal line and are each spaced substantially an equal distance from the pole of the mold cavity, wherein the second latitudinal line is spaced farther from the pole than the first latitudinal line, and wherein receiving feedback sensor data indicative of the rate of movement of the melt front comprises receiving data from the at least two first temperature sensors, receiving data from the at least two second temperature sensors, and comparing the data received from the at least two first temperature sensors with the data received from the at least two second temperature sensors.

16. The method of claim 15, wherein a first distribution of the at least two first temperature sensors along the first latitudinal line is angularly offset from a second distribution of the at least two second temperature sensors along the second latitudinal line to accommodate irregularly moving melt fronts.

17. The method of claim 16, wherein the first distribution is angularly offset 45 degrees from the second distribution.

18. The method of claim 16, wherein the at least two first temperature sensors comprises four temperature sensors and the at least two second temperature sensors comprises four temperature sensors.

19. The method of claim 16, wherein the at least one mold pin comprises at least two mold pins, and wherein the at least two mold pins are spaced equally apart from each other and are each spaced an equal distance from the pole of the spherical mold cavity.

20. The method of claim 15, wherein the mold comprises at least two third temperature sensors that are spaced substantially equally apart from each other along a third latitudinal line and are each spaced substantially an equal distance from the pole of the mold cavity, wherein the third latitudinal line is spaced farther from the pole than the second latitudinal line, and wherein receiving feedback sensor data indicative of the rate of movement of the melt front comprises receiving data from the at least two first temperature sensors, receiving data from the at least two second temperature sensors, receiving data from the at least two third temperature sensors, and comparing the data received from the at least two first temperature sensors, the data received from the at least two second temperature sensors, and the data received from the at least two third temperature sensors.

21. The method of claim 20, wherein a first distribution of the at least two first temperature sensors along the first latitudinal line is angularly offset from a second distribution of the at least two second temperature sensors along the second latitudinal line, and wherein the second distribution of the at least two second temperature sensors along the second latitudinal line is angularly offset from a third distribution of the at least two third temperature sensors along the third latitudinal line, so as to enable receipt of feedback sensor data indicative of a rate of movement of an irregularly moving melt front.

22. The method of claim 21, wherein the first, second, and third latitudinal lines are spaced evenly apart longitudinally.

* * * * *